US009515960B2

(12) United States Patent
Briscoe (10) Patent No.: US 9,515,960 B2
(45) Date of Patent: Dec. 6, 2016

(54) OBTAINING INFORMATION FROM DATA ITEMS

(75) Inventor: Robert John Briscoe, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 46 days.

(21) Appl. No.: 14/000,546

(22) PCT Filed: Feb. 23, 2012

(86) PCT No.: PCT/GB2012/000188
§ 371 (c)(1),
(2), (4) Date: Aug. 20, 2013

(87) PCT Pub. No.: WO2012/117215
PCT Pub. Date: Sep. 7, 2012

(65) Prior Publication Data
US 2013/0329739 A1    Dec. 12, 2013

(30) Foreign Application Priority Data

Feb. 28, 2011    (GB) .................................. 11250228.1

(51) Int. Cl.
*H04L 12/947*    (2013.01)
*H04L 12/26*    (2006.01)
(Continued)

(52) U.S. Cl.
CPC ............. *H04L 49/25* (2013.01); *H04L 43/028* (2013.01); *H04L 47/36* (2013.01); *H04L 69/166* (2013.01); *H04L 69/22* (2013.01)

(58) Field of Classification Search
None
See application file for complete search history.

(56) References Cited

U.S. PATENT DOCUMENTS

2003/0026252 A1*    2/2003    Thunquest et al. ........... 370/390
2003/0110292 A1*    6/2003    Takeda .................... H04L 29/06
                                                        709/245
(Continued)

FOREIGN PATENT DOCUMENTS

| CN | 1874301 A | 12/2006 |
| CN | 101557349 A | 10/2009 |
| WO | 2013/098540 | 7/2013 |

OTHER PUBLICATIONS

Comer, Douglas E., Internetworking With TCP/IP, 2000,4th Ed, p. 110.*

(Continued)

*Primary Examiner* — Jeffrey M Rutkowski
*Assistant Examiner* — Andre Tacdiran
(74) *Attorney, Agent, or Firm* — Nixon & Vanderhye P.C.

(57) ABSTRACT

Methods and apparatus are disclosed for obtaining and processing information from a predetermined portion of a header of a data item such as an IP packet transmitted via a communication network such as a packet network, the portion carrying a codepoint selected from a first set of codepoints each of which has a pre-defined meaning according to a first pre-defined communication protocol. The method comprises: receiving the data item; inspecting the header whereby to determine the codepoint carried by the predetermined portion thereof; identifying whether the codepoint is a member of a second set of codepoints, the second set comprising fewer possible codepoints than the first set; and in the event that the codepoint is identified as being a member of the second set, and in dependence on such an identification being made, interpreting that codepoint according to a different pre-defined communication protocol as having a different pre-defined meaning and (Continued)

- Probabilistic Identification of a New Protocol routing the data item via the communication network via the second pre-defined communication protocol.

15 Claims, 5 Drawing Sheets

(51) Int. Cl.
    *H04L 12/805*     (2013.01)
    *H04L 29/06*     (2006.01)

(56) References Cited

U.S. PATENT DOCUMENTS

| | | | |
|---|---|---|---|
| 2005/0267943 A1* | 12/2005 | Castaldi et al. | 709/206 |
| 2008/0304413 A1 | 12/2008 | Briscoe et al. | |
| 2012/0176932 A1* | 7/2012 | Wu | H04L 61/2084 370/254 |
| 2013/0223447 A1* | 8/2013 | Kahng | H04L 61/609 370/392 |

OTHER PUBLICATIONS

International Search Report for PCT/GB2012/000188 mailed Jun. 8, 2012.
U.S. Appl. No. 14/369,481, filed Jun. 27, 2014.
D. Giordano, "Ethernet Preamble Variation—Use Ethernet Preamble to Perform Frame's Classification and a Switching Optimization", Internet Citation, Oct. 21, 2007, pp. 1-7.
J. Touch, "Updated Specification of the IPv4 ID Field", Oct. 22, 2010 (15 pages).
Search Report dated Jun. 3, 2015 issued in corresponding Chinese Application No. 201280010662.6 (2 pgs.).

* cited by examiner

Figure 1 - IPv4 header

Figure 2 – IPv6 header

| 0 | 1 | 2 |
|---|---|---|
| R E S | D F | M F |

Figure 3 - The IPv4 Flags Field

```
 0                   1                   2                   3
 0 1 2 3 4 5 6 7 8 9 0 1 2 3 4 5 6 7 8 9 0 1 2 3 4 5 6 7 8 9 0 1
        Identification       | Flags |           Offset
 X X X X X X X X X X X X X X X X  X 1 0  0 0 0 0 0 0 0 0 0 0 0 0 0
```

Figure 4 – Values of the Fragmentation Fields that Indicate a so-called 'Atomic' Packet (NB "X" means "either 1 or 0")

|   | 0           |             |             | 1           |             | 2           |             |             | 3     |
|---|-------------|-------------|-------------|-------------|-------------|-------------|-------------|-------------|-------|
|   | 0 1 2 3 | 4 5 6 7 | 8 9 0 1 | 2 3 4 5 | 6 7 8 9 | 0 1 2 3 | 4 5 6 7 | 8 9 0 1 |
|   | Identification |||| Flags | Offset |||
| 1. | X X X X X X X X X X X X X X X X |||| 0 1 0 | 0 0 0 0 0 0 0 0 0 0 0 0 0 |||
| 2. |  |  |  | ExA | X 1 0 | 0 0 0 0 0 0 0 0 0 0 0 0 0 |||
| 3. | 0 0 0 0 0 0 0 0 0 0 0 0 0 ||| ExA | 0 |  |||
| 4. |  |  |  | 1 0 1 |  |  |||
| 5. | 0 0 0 0 0 0 0 0 0 0 0 0 0 ||| 1 0 1 | 0 1 0 | 0 0 0 0 0 0 0 0 0 0 0 0 0 |||

Figure 5 - Example of Experimental Use of Bits 13-15 of the old Identification Field

| Registry field | Registered Value |
|---|---|
| Leftmost bit: | 13 |
| No. of bits allocated: | 3 |
| Subfield name: | ExA |
| RFC: | 6789 |
| Subfield defined if: | Reserved flag=X |

Figure 6 – Example standards registry entry defining the new protocol "ExA"

Figure 7 - Probabilistic identification of a New Protocol

Figure 8 – Packet Forwarding Equipment

OBTAINING INFORMATION FROM DATA ITEMS

This application is the U.S. national phase of International Application No. PCT/GB2012/000188 filed 23 Feb. 2012 which designated the U.S. and claims priority to EP 11250228.1 filed 28 Feb. 2011, the entire contents of each of which are hereby incorporated by reference.

TECHNICAL FIELD

The present invention relates to obtaining information from data items transmitted via a communication network. More specifically, aspects of the present invention relate to methods and apparatus for obtaining information from a predetermined portion, such as a field, in the header of a data item such as an Internet Protocol packet transmitted via a communication network such as a packet network.

BACKGROUND TO THE INVENTION AND PRIOR ART

We start by presenting some basic concepts to facilitate the understanding of the mechanisms that are presented further on.

Packets

A data sender usually splits data to be sent into small units known as packets. Each packet consists of a header and a payload carrying the data to be delivered. The header contains fields defined by the relevant communication protocol. The great majority of packets carried by commercial networks nowadays are so-called IP packets, where "IP" is the Internet Protocol. This ensures that a network of routers can forward any packet from the source to its destination. IP is a connectionless protocol—that means that the header information in each data packet is sufficiently self-contained for routers to deliver it independently of other packets; each packet could even take a different route to reach the destination.

Packet Headers

Figure 1:
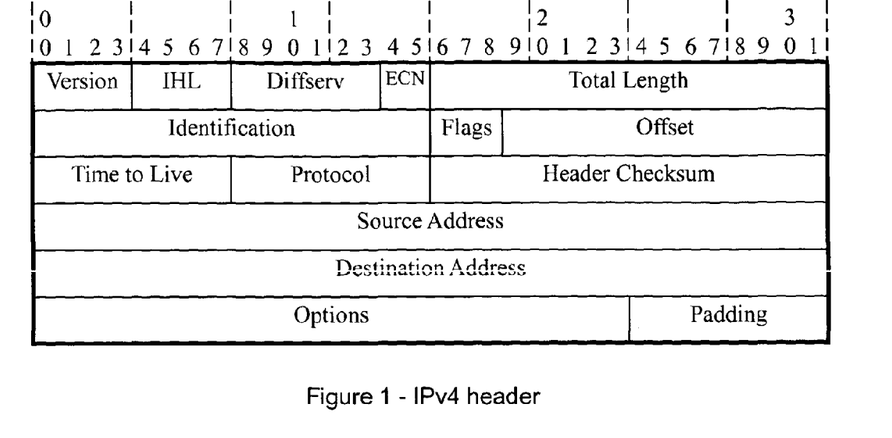
FIG. 1 shows the layout and names of the fields of an IPv4 header.

The Internet Protocol has evolved through a number of versions although only two are currently used: IPv4 and IPv6, the latter currently still having relatively low uptake. The layout and names of the fields of the IPv4 header are shown in FIG. 1, which has been based principally on Internet Engineering Task Force (IETF) "Request for Comments" (RFC) document IETF RFC 791 but also reflects more recent updates (IETF RFCs 2474, 3260 and 3168). IETF RFC 791, entitled "Internet Protocol" was published in September 1981, and is available on the internet at the http world wide website ietf.org/rfc/rfc791.txt. The other IETF RFC documents are also available on the internet via the http world wide website ietf.org/rfc.html or elsewhere.

Referring to FIG. 1, the numbers along the top, above the six rows of field-names, index each bit of the header in rows of 32 bits, numbered "00" to "31". Three fields which will later be referred to in particular in relation to preferred embodiments of this invention are all on the second row, and relate to packet fragmentation, which will be discussed below. These fields are the 'Identification', 'Flags' and 'Fragment Offset' fields.

Figure 2:
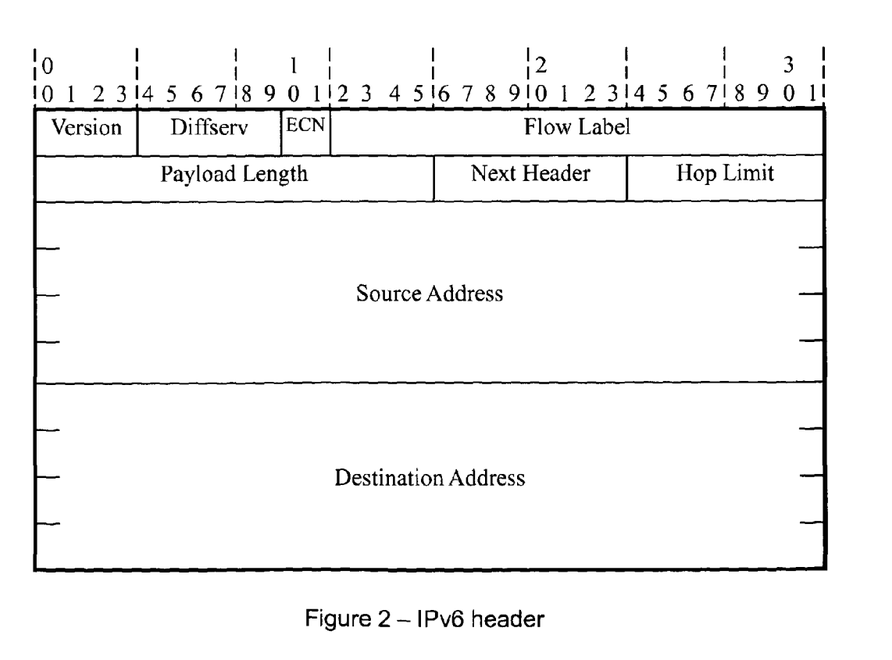
FIG. 2 shows the layout and names of the fields of an IPv6 header.

FIG. 2 shows the layout and names of the fields of the header of an IPv6 packet. An obvious difference is that IPv6 has larger fields for the source and destination addresses. Also it will be noted that no fields to do with fragmentation are present in the base IPv6 header.

Protocol Evolution

From time to time, a new requirement has to be met, and can be achieved by updating part of a communications protocol, rather than completely replacing it. Most protocols are defined so that some values of various fields are not used, but are reserved for future use. The idea is that new features can be added by bringing values into use from these "reserved" ranges.

When reserved values are brought into use for a new variant of a protocol, there are often problems. Existing equipment built before the protocol was updated is usually meant to take some default action if it encounters a packet carrying one of these reserved values. However, when a reserved value is first used, it is generally discovered that some legacy equipment does not take the specified default action, possibly for one of two reasons:

Bugs:

Many manufacturers cut corners and do not test whether their equipment acts correctly when it encounters packets carrying values not in common usage at the time of implementation;

Precautionary Security:

Many manufacturers deliberately do not set their equipment to implement the standard default action when it encounters a packet carrying a reserved value. Instead, on the basis that the appearance of a previously unused value might be a symptom of some unknown security attack, they set their equipment to discard the packet as a precaution.

Therefore, the first adopters of a new protocol typically discover that arbitrary equipment seems to crash inexplicably, or packets carrying new values never reach their destination because some item of equipment wrongly discards such packets (termed being black-holed). Such equipment will be referred to as a "non-compliant middlebox".

The outcome is often that new features often fail to be deployed, or their introduction is delayed, because no company wants to bear the cost of all the support calls that will result when their (possibly) perfectly-implemented update is taken to be the cause of numerous problems that it triggers—problems that are actually due to other incorrectly implemented equipment that has already been deployed.

Fragmentation

Figure 3:
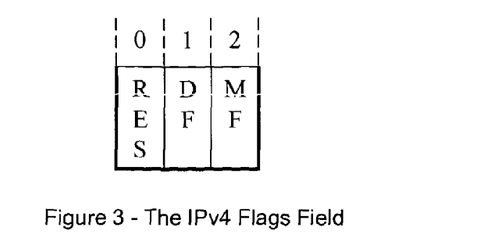
FIG. 3 shows the IPv4 'Flags' field in detail.

The three fields referred to earlier as being of particular relevance to packet fragmentation are the 'Identification', 'Flags' and 'Fragment Offset' fields. The IPv4 'Flags' field consists of three bits (shown in FIG. 3), only the second and third of which are currently used, the first being reserved (RES) for future use. The other two are termed 'Don't Fragment' (DF) and 'More Fragments' (MF). Further information about this is available in IETF RFC 791, referred to earlier.

The sender of every IPv4 packet must label each packet using the 16-bit 'Identification' field. A source should cycle through the whole of the possible number space that could be written in the 'Identification' field before repeating a previously used identifier. There is no requirement to cycle through the numbers in any particular order, as long as all of the $2^{16}$ available numbers are used before any are repeated.

Each link in a network is characterised by a maximum size of packet it can transmit—referred to as the link's "maximum transmission unit" (MTU). If an IPv4 router needs to forward an arriving packet down a link that has an MTU smaller than the packet, the router may break the packet down into fragments. Equivalently, a source may break a packet down into fragments before sending it.

The process of fragmentation involves breaking the original payload down into sufficiently small fragments that they will each fit into the link, and placing a copy of the original header on each fragment. Each header is then modified so that, once a set of fragments arrives at its destination, they contain sufficient information to allow reassembly of the original packet:

Because all the fragment headers start as copies of the original packet, they contain the same value in the 'Identification' field as the original packet before fragmentation.

The 'Fragment Offset' field of each fragment is set to index where in the original payload this fragment was taken from, as a number of octets (bytes) from the start.

The 'More Fragments' (MF) flag is set to 1 on all the fragments of a packet except the last, in which it is cleared to zero.

Thus, each fragment contains sufficient information for the ultimate destination to reassemble them into the original packet.

Note that the sender of an un-fragmented IPv4 packet should initially set the 'More Fragments' flag to zero and the 'Fragment Offset' to zero.

If the sender (or a router) sets the 'Don't Fragment' (DF) flag, then the packet should not be fragmented when it arrives at a subsequent router even if it is too large to fit within the MTU of a link. Instead, the router should discard the packet, and optionally return a control packet to the source containing an appropriate error message.

Modern Approach to Fragmentation

When IPv6 was defined, it was decided that routers would no longer do fragmentation. This allowed routers to be simplified. Instead, it was decided that the sender would become responsible for making sure its packets were small enough to fit through the link with the smallest MTU on the path (the path MTU or PMTU). The sender can do fragmentation in IPv6, but that is not relevant to this discussion.

The IETF is in the process of recommending that IPv4 sources adopt a similar approach to IPv6 in this regard. To achieve this, it is being recommended that all IPv4 sources set the 'Don't Fragment' (DF) flag and clear the 'More Fragments' (MF) flag and the 'Fragment Offset' field (see: "Updated Specification of the IPv4 ID Field" (Joe Touch, 22 Oct. 2010), IETF Internet Draft <draft-ietf-intarea-ipv4-id-update>, available on the internet at ha website tools.ietf.org/html/draft-ietf-intarea-ipv4-id-update-01). Most IPv4 sources already disable fragmentation in this way, so the IETF exercise largely documents what is essentially current best practice.

PRIOR ART

Many security protocols (for instance digital signatures) require a "hash" of a combination of numbers from a large number-space to be placed in a field that only fits a much smaller number space. If the receiver of the protocol knows the same combination of numbers, it can check whether the hash it calculates matches the hash in the protocol field. Similarly, hash tables are used to reduce the look-up time when looking up a number from a large number-space without having to search the whole space. Further information on hash tables is available from standard sources on the internet and elsewhere.

The IPv4 'Identification' field of non-fragmented packets has been proposed to be re-used in various ways in the past, such as the following:

In a paper by Savage et al entitled: "Practical Network Support for IP Traceback" (SIGCOMM Comput. Commun. Rev. 30:295-306 ACM (August 2000)), it was suggested that routers probabilistically either re-used or not the whole IP ID field in order to transmit route identification messages to a router downstream, and that a downstream router interpreted these messages using a new internal protocol. It was not made clear how the downstream router could know whether a particular packet used the new protocol, or whether the ID field in the packet had been set arbitrarily by the original source of the packet.

It appears possible that the authors believed that un-fragmented packets on today's Internet all use some default value in the IPv4 'Identification' field such as zero, whereas in general, they in fact do not (as discussed earlier).

European patent application EP1505770 (Jones et al) refers to the possibility of using the IPv4 'ID' field for a similar purpose to "Savage et al". It offers no other information to reveal how the authors might have intended the field to be used, however.

There are various cases where values not used in one protocol are commandeered for use in another protocol. For instance:

The unused values above 1500 in the proprietary Ethernet Length field were standardised by the IEEE 802 committee to have the semantic of an Ethertype.

US patent application US 2009/0103548 (Weiss), the preamble to an Ethernet frame is said to have fallen into disuse. This document includes a proposal to insert a duplicate of another protocol field in the place where the preamble used to go in order that this duplicate value can be read fractionally sooner, rather than waiting for it to appear later in the protocol header.

An IETF Internet Draft entitled "Ethernet Preamble Variation—Use Ethernet Preamble to Perform Frame's Classification and a Switching Optimization" (draft-giordano-eth-pre-class-opt-00) by Daniele Giordano is similar to the proposal in the "Weiss" patent application referred to above. It proposes a variation of the Ethernet frame structure to perform a frame's classification and a switching optimisation. Using a priority field "PRI", the switch is able to change its switching modality in dependence on the priority value between a "store & forward" mode and a "cut through" mode. Insofar as these different modes can be regarded as different protocols, it will be noted that the proposed codepoints used in the second mode/protocol are different from those used in the first. As a result, the frames of the second protocol can be deterministically distinguished from those of the first. In particular, the Start-Frame-Delimiter (SFD) is different.

In cases such as these, it will be understood that the values used in the second or later protocol are different from those used in the first or earlier protocol. Frames sent according to the second protocol can therefore be deterministically distinguished from those sent according to the first.

Similarly, there may be examples of cases where a protocol field was defined but the usage was never taken up or fell into disuse, so it was then re-defined for a different purpose. Also there may be cases where a subset of the values of a protocol field were defined but never used or fell into disuse, so new meanings were proposed for these values, either by "de jure" standardisation or by "de facto" usage.

It will be understood that none of the prior art techniques discussed above suggest the deployment of a protocol where the semantics of a protocol field are deliberately ambiguous, but probabilistically meaningful.

SUMMARY OF THE INVENTION

According to a first aspect of the present invention, there is provided a method of obtaining information from a predetermined portion of a header of a data item transmitted via a communication network, said portion carrying a codepoint selected from a first set of codepoints each of which has a first pre-defined meaning according to a first pre-defined communication protocol, the method comprising:
  receiving the data item;
  inspecting the header of the data item whereby to determine the codepoint carried by the predetermined portion thereof;
  identifying whether the codepoint is a member of a second set of codepoints, the second set of codepoints comprising fewer possible codepoints than the first set of codepoints; and
  in the event that the codepoint is identified as being a member of the second set of codepoints, and in dependence on such an identification being made, interpreting that codepoint according to a second pre-defined communication protocol as having a second pre-defined meaning, said second communication protocol differing from said first communication protocol, and said second meaning differing from said first meaning.

By virtue of preferred embodiments of the above method, certain codepoints having a particular meaning according to an "existing" or "old" communication protocol which may still be in use (such that those codepoints might have been assigned to data items in accordance with that existing/old communication protocol, and are capable of being interpreted according to that existing/old communication protocol as having their "existing" or "old" meanings by apparatus receiving data items carrying such codepoints), may instead be interpreted, if received by suitably "enabled" receiving apparatus, according to a different, new protocol, under which those codepoints have a different, new meaning. Data items carrying such codepoints that have been set by apparatus complying with the new protocol may be indistinguishable from data items carrying such codepoints that have been set by apparatus complying with the existing/old protocol, and may therefore be treated in the same way as data items sent by apparatus complying with the existing/old protocol if received by "non-enabled" apparatus complying with the existing/old protocol, but if such data items are instead received by "enabled" apparatus complying with the new protocol (i.e. performing a method according to a preferred embodiment), such apparatus may treat them on the basis that they have been received from apparatus complying with the new protocol, interpret the codepoints accordingly, and obtain information from them that "non-enabled" apparatus may be unable to obtain. Due to the indistinguishable nature of the data items in question, this advantage may be obtained without the risk that their presence "arouses suspicion" and leads to them being dropped or causing problems if received by "non-enabled" apparatus.

According to preferred embodiments, the communication network is a digital network such as a packet network.

It will be understood however that embodiments of the invention may be applicable in relation to other types of network carrying data items other than packets, provided that such data items have (or are associated with) "headers" or information-carrying portions equivalent to the "headers" of Internet Protocol packets.

According to preferred embodiments, the data items are Internet Protocol packets, such as IPv4 packets, but they may be packets sent according to other IP versions, or may be data items in accordance with other protocols as well.

The predetermined portion of the header (or the equivalent information-carrying portion thereof) from which information may be obtained may comprise one or more fields or parts of fields in or associated with the data item.

According to preferred embodiments, in particular embodiments such as those where the data items are Internet Protocol packets each having an 'Identification' field in their header, the predetermined portion may comprise part or all of the 'Identification' field in the header of the data items.

Preferred embodiments are particularly applicable in relation to scenarios where the first protocol uses the available number-space uniformly, or at least fairly uniformly.

According to preferred embodiments, the ratio between the number of members in the first set of codepoints and the number of members in the second set of codepoints is large, which, at least in cases where the first protocol uses the available number-space uniformly or fairly uniformly, ensures that the probability of a codepoint randomly selected from the first set "by chance" also being in the second set will be small. Preferably the ratio is at least $2^n:1$, where n is a number such as 4, 8, 12, 13 or 14.

According to preferred embodiments, the first pre-defined communication protocol may relate to the fragmentation of data items. According to such embodiments, the first pre-defined meaning of a particular codepoint may relate to the identification of fragments of a data item carrying that codepoint.

According to preferred embodiments, the second pre-defined communication protocol may relate to a path or a network characteristic such as network congestion or congestion on a path in a network. According to such embodiments, the second pre-defined meaning of a particular codepoint may relate to congestion experienced or expected to be experienced by a data item carrying that codepoint.

It will be understood however that the information obtainable from the data items when interpreted according to the first and/or second protocol need not relate to a characteristic. It may instead or additionally relate to an instruction conveyed by the data item.

The method may comprise a further step, performed in relation to one or more data items in dependence on information obtained from the data item in question or from a plurality of such data items. The further step may involve forwarding or possibly "not forwarding" (e.g. dropping) the data item or data items, in a manner or on a path which may depend on the information obtained therefrom, for example. Alternatively or additionally, it may involve recording, storing or reporting information based on that obtained, in order to police a flow of which the data item or items forms a part, or to allow it to be policed, for example. Alternatively or additionally, it may involve performing an action in response to an instruction conveyed by the information obtained from one or more data items, for example. Other such actions may also be performed, of course.

The method may further comprise interpreting the codepoint according to the first pre-defined communication protocol as having the first pre-defined meaning if the codepoint is not identified as being a member of the second set of codepoints.

According to a second aspect of the present invention, there is provided apparatus for obtaining information from a predetermined portion of a header of a data item transmitted via a communication network, said portion carrying a codepoint selected from a first set of codepoints each of which has a first pre-defined meaning according to a first pre-defined communication protocol, the apparatus comprising:
  a receiver for receiving the data item;
  data item inspection means operable to inspect the header of the data item whereby to determine the codepoint carried by the predetermined portion thereof, and to identify whether the codepoint is a member of a second set of codepoints, the second set of codepoints comprising fewer possible codepoints than the first set of codepoints; and an interpretation means, operable, in the event that the codepoint is identified as being a member of the second set of codepoints, and in dependence on such an identification being made, to interpret that codepoint according to a second pre-defined communication protocol as having a second pre-defined meaning, said second communication protocol differing from said first communication protocol, and said second meaning differing from said first meaning.

The apparatus may comprise or be a part of a router or another such network element for receiving and/or forwarding data items such as packets.

According to preferred embodiments, the interpretation means may further be operable, in the event that the codepoint is not identified as being a member of the second set of codepoints, to interpret the codepoint according to the first pre-defined communication protocol as having the first pre-defined meaning.

The various options and preferred embodiments referred to above in relation to the first aspect are also applicable in relation to the second aspect.

It will be understood that preferred embodiments of the invention allow values in a protocol header field to be assigned a new protocol meaning even though the same values already have or had a meaning under an existing or old protocol.

Packets complying with such a new protocol may therefore be indistinguishable from packets already present on the network that were sent under the old/existing protocol. Therefore, during initial deployment, packets complying with the new protocol will not encounter the bugs and security precautions that they would have been susceptible to if the new protocol had required packets complying therewith to carry different values to those in existing packets, or to be deterministically distinguishable therefrom in any way.

The above idea is particularly applicable where the initial protocol definition includes a relatively large field which the source may set to any of its possible values, all of which are meaningless and/or ignored but not changed by existing network equipment. Then, as new protocol fields are required, sub-ranges of the possible number space covered by this large field can be given new protocol semantics. Sending equipment that has been updated to use the new protocol will confine the codepoints it uses to the defined sub-range, and receiving equipment will recognise packets carrying codepoints in this sub-range as "very probably" set by another piece of equipment that "speaks" (i.e. "is sending packets carrying data complying with") the new protocol.

Occasionally, this assumption may be incorrect, when new equipment encounters a packet from old equipment that happens by chance to have used one of the numbers/codepoints in the defined sub-range as it cycles through the larger number space. However, it will often be possible to ensure that the new equipment does no harm, or minimal harm, to packets sent by old equipment that it mistakenly interprets as complying with the new protocol.

A second stage of protocol evolution can be defined to remove the ambiguity of the interim stage just described. A reserved value in a second field can be set to flag that the first field should be unambiguously interpreted with its new protocol semantics.

This two-stage process of "protocol evolution" may be used to remove the current "chicken-and-egg" problem where:

before a protocol is widely used, it triggers so many problems in other equipment that it can never become widely enough deployed to prove that it would be useful;

a new protocol has to be widely used before it will not trigger problems in other equipment, because only then do manufacturers make allowance for its existence by including it in their test routines and by not treating it as an unknown security risk.

If data item receiving and data item forwarding equipment such as routers are configured to obtain information from data items in accordance with preferred embodiments of the invention, it becomes possible to arrange for the following when deploying a new protocol:

during an interim stage of incremental deployment, individual data items complying with a new protocol do not or need not differ from individual data items complying with an earlier protocol;

but collectively, those data items complying with the new protocol all carry numbers within a small sub-range, whereas those complying with the old protocol will carry any number drawn from the whole possible range of numbers.

The above should not be confused with what occurs when hashing techniques are used. As explained earlier, these may involve a large number space held outside the protocol and the whole of a protocol field being used for the subset of the number space used by the hash. In contrast, according to embodiments of the present invention, while a previous protocol may have used a number-space that fits within the protocol field in question, a new protocol may then re-use a subset of the larger number-space within a smaller portion of the protocol field.

Similarly, referring again to techniques such as those proposed in the "Savage et al" paper discussed earlier, there is no suggestion of a new protocol using only a (smaller) subset of the number space that could possibly fit within a protocol field used by an old or existing protocol, whereby to allow a receiving entity to identify packets which are highly likely to have been sent using the new protocol (while potentially being indistinguishable from packets which have been sent using the old or existing protocol), and interpret them accordingly in dependence on such an identification being made.

BRIEF DESCRIPTION OF THE DRAWINGS

A preferred embodiment of the present invention will now be described with reference to the appended drawings, in which.

DESCRIPTION OF PREFERRED
EMBODIMENTS OF THE INVENTION

With reference to the accompanying figures, a method according to a preferred embodiment will be described that may be used to facilitate incremental deployment of a new protocol without causing or increasing the likelihood of the types of problems such as those described above that often occur when a new protocol is deployed.

The way IPv4 was defined and the way it currently happens to be used meet all the criteria of the 'old' protocol referred to above. An example first embodiment of the invention follows based on IPv4 as the initial 'old' protocol, and a modification to IPv4 as the 'new' protocol, although it will be recognised that alternative embodiments of the invention apply in respect of other 'old' and (potential) 'new' protocols.

Figure 4:
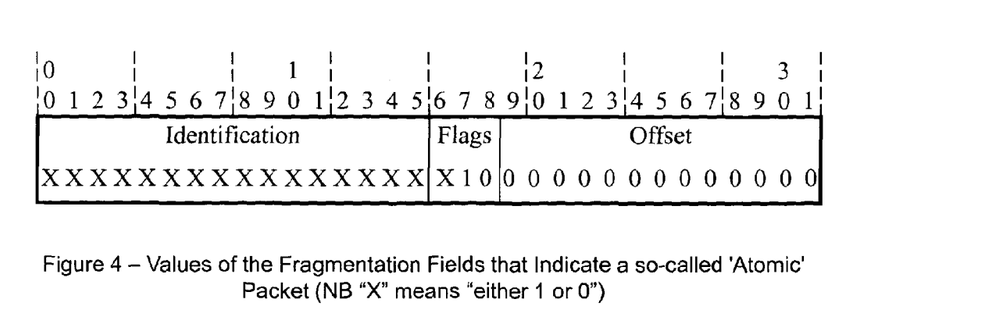
FIG. 4 shows the values of the 'Fragmentation' fields that would indicate a so-called 'atomic' packet.

According to measurements in 1999, only 0.22% of packets were fragments. A large majority of IPv4 sources set the 'Flags' and 'Offset' fields as they are shown in FIG. 4, which shows the values of the fields of relevance to 'Fragmentation' that would indicate a so-called 'atomic' packet (NB "X" means "either 1 or 0"). This indicates that the packet should not be fragmented (DF=1), and has not already been fragmented (MF=0, Offset=0). Such a packet is sometimes termed 'atomic', because it cannot be broken into fragments.

The 'Identification' field of an atomic packet will never be needed to reassemble the packet. Therefore the 'Identification' field is of little or no importance, and is generally ignored (and not changed) by existing network equipment. In FIG. 4, the value "X" shown in each bit position of the 'Identification' field indicates that the value of these bits is irrelevant to the 'old' IPv4 protocol. "X" essentially means "don't care", or "doesn't matter", or "either 1 or 0".

Of the large majority of IPv4 sources that disable fragmentation, a large majority still set the 16-bit 'Identification' field of each packet to any one of its $2^{16}$ possible values, as if fragmentation might occur. Only a minority of those IPv4 sources that disable fragmentation set the 'Identification' field to a default value of zero.

An example of an implementation that uses all $2^{16}$ values is the mainline Linux implementation of IP, which is in widespread use in both servers and handheld devices. In common with most implementations of network protocols, its primary application programming interface (API) is an abstraction termed a 'socket'. An application programmer may craft individual packets using what is called a 'raw socket'. However, invariably programmers use the connect ( ) system call to connect to the socket in order to facilitate ongoing communication with a remote destination, whether sending a stream of bytes broken up into segments (e.g. TCP) or a set of discrete datagrams (e.g. UDP). Whenever a programmer has used the connect ( ) system call, the Linux implementation of IP will generate packets with values in their ID fields that cycle through the whole number-space. Only in the rare cases when the connect ( ) system call has not been used does Linux default to an ID field of zero.

Given that the large majority of IPv4 sources disable fragmentation, an "interim" stage of protocol evolution can be defined where values in sub-ranges of the 'Identification' field can be given new specific semantics. However, because the large majority of these sources still select packet 'ID' values from the whole number space, existing devices will already be sending numerous packets that use all the values in any sub-range of the number space.

For the purposes of this example embodiment, we will assume that a new protocol (termed "Protocol ExA") needs a field in the IP header with up to eight new codepoints (including a default value meaning that the old protocol is in use). Therefore it will need three extra bits in the IPv4 header (because $8=2^3$).

The traditional way to distinguish a new version of IP from the old IPv4 would be to make the new protocol packets distinguishable from those sent under the old protocol, perhaps by setting the 'Reserved' flag (bit 0 in FIG. 3 or bit 16 in FIG. 4), which has previously always been cleared to zero in all packets sent using the Internet. However, some existing Internet equipment discards packets with the 'Reserved' flag set, merely because such packets are unexpected. Such behaviour (i.e. discarding packets because a 'Reserved' flag has been set) is contrary to the Internet protocol standard, but it happens, for reasons such as those set out earlier, under the heading "Protocol Evolution".

Therefore, when implementing a method according to our example embodiment, our new version of IPv4 will allow the 'Reserved' flag still to be cleared to 0. The new version of IPv4 also allows the 'Reserved' flag to be set to 1, however, which makes the new meaning of the packet header unambiguous. However, the new protocol defines the 'Reserved' flag as "either 1 or 0", which is termed "don't care" and indicated as "X" in bit 16 of FIG. 4.

Figure 5:
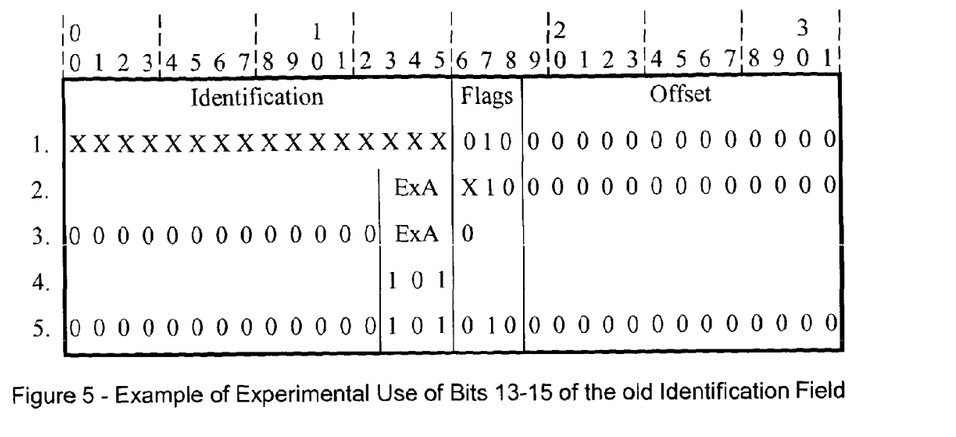
FIG. 5 illustrates an example of "experimental" use of bits 13 to 15 of the old 'Identification' field in the IPv4 header (i.e. use without requiring the 'Reserved' flag to be set to "1"

As an example, we will assume that the required eight codepoints are defined as all the eight possible combinations of the three least significant bits of the 'Identification' field, as shown in FIG. 5. Up to eight of the codepoints formed from the possible combinations of bits in this three-bit sub-field could each be assigned a new meaning under the new protocol.

If the 'Reserved' flag is cleared to zero, the rest of the bits in the 'ID' field not within the newly-defined sub-field (the most-significant 13 bits) have to be set to a default value (e.g. zero). Then old IPv4 equipment cycling through all the values of the 'ID' number-space would happen to use one of the eight newly-defined values with a probability of 1 in $2^{13}$ ($=2^{(16-3)}$).

Equipment designed to comply with the new protocol would assume that packets with 13 zeros in the 13 most significant bits had been sent by other equipment complying with the new protocol and it would act on them according to the meanings assigned to the values in the 3 assigned bits. This assumption would only be wrong with a probability of 1 in $2^{13}$, or about 0.01%.

Sending or forwarding equipment wishing to make the new meaning unambiguous could set the 'Reserved' flag to 1 as well as using any of the eight values in the newly defined sub-field of the 'Identification' field. This allows a trade-off between:

a new protocol that is unambiguously different to the old IPv4 (Reserved=1) but cannot communicate through non-compliant middleboxes and a new protocol that is only probabilistically different from the old IPv4 (Reserved=0) but will safely traverse all existing equipment on the Internet.

FIG. 5 illustrates an example of the "experimental" or "provisional" use of bits 13 to 15 of the old 'Identification' field in the IPv4 header (i.e. use without requiring the 'Reserved' flag to be set to "1". The rows numbered 1 to 5 illustrate the stages used to define then use the new protocol, each of the rows representing an increasingly specific definition of the protocol:

Row 1:

Initially, only the old IPv4 protocol is defined (as shown in the first row of FIG. 5 and also shown in FIG. 4), with "don't care" values for the first 17 bits of the 'Fragmentation' header fields. The remaining bits are arranged to indicate that the packet is atomic, i.e. the packet must not be fragmented (DF=1) and has not been fragmented (MF=0, Offset=0).

Figure 6:
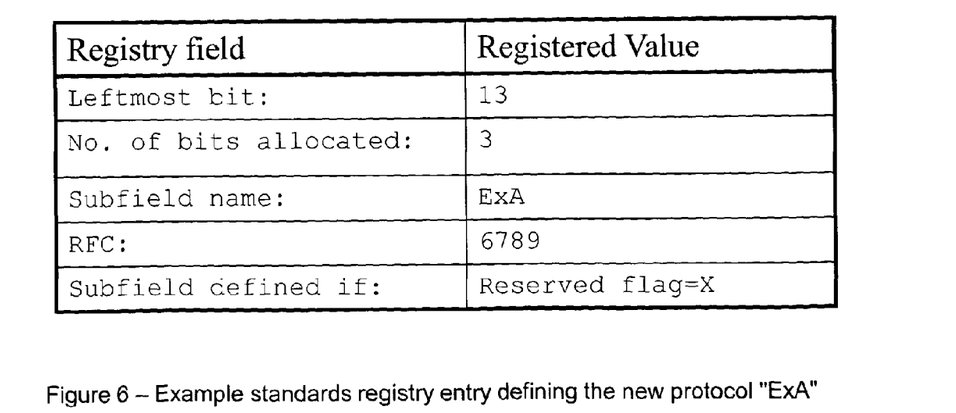
FIG. 6 shows an example Standards Registry entry defining a new protocol called "ExA"

Row 2:

In a second stage (i.e. the second row of FIG. 5), the three least significant bits of the old 'Identification' field have been registered as a new protocol called "ExA", on condition that the packet is atomic and the 'Reserved' flag can be either 0 or 1. For instance, a protocol standards body such as the Internet Assigned Numbers Authority (IANA) might hold a registry entry defining the meaning of these new bits as shown in FIG. 6. The third row of FIG. 6 gives the name, "ExA" of the new protocol for the sub-field. The first two rows of FIG. 6 specify which contiguous bits are allocated to the new protocol. The fourth row of FIG. 6 indicates that the new protocol ExA is fully specified in request for comments (RFC) number 6789 (for example). The final, fifth row of FIG. 6 indicates that the new bits should be considered to have the meanings defined by the new ExA protocol irrespective of whether the 'Reserved' Flag is set to 0 or 1.

Row 3:

In a third stage (the third row of FIG. 5), sending/forwarding equipment that implements the new protocol chooses to clear the 'Reserved' flag to zero in order to avoid problems with non-compliant middleboxes. It therefore also clears the remainder of the bits in the 'Identification' field that are not used by the new protocol ExA, i.e. the most significant 13 bits. It is then free to use the 3-bits assigned to the new protocol ExA in any combination that is valid within the new protocol specification.

Row 4:

In a fourth stage (the fourth row of FIG. 5), sending/forwarding equipment complying with the new protocol chooses to use the codepoint "101" (for example), which will have a specific meaning defined in the relevant specification of protocol ExA.

Figure 8:
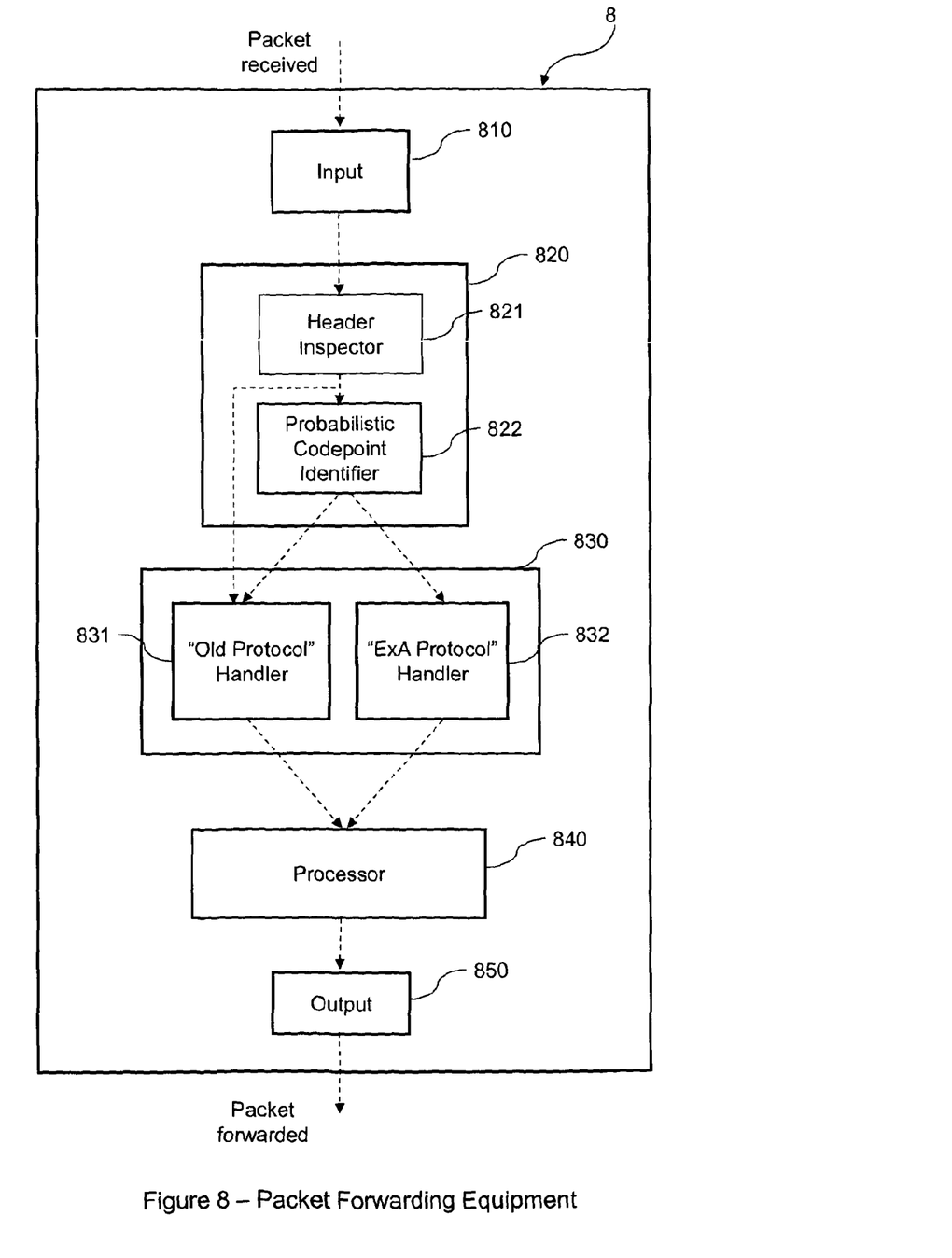
FIG. 8 illustrates the functional modules of packet forwarding equipment according to a an embodiment of the invention.

Row 5:

In a fifth stage, forwarding or receiving equipment that has implemented the new protocol ExA will read the packet header and obtain information from it which may be in accordance with the new protocol. This may be done using the following sub-steps (illustrated in FIG. 7), which may be performed from a 'Start' point (step s70) to a 'Continue' point (step s81) in respect of each packet, by packet-receiving or packet-receiving/forwarding equipment 8 such as a router, an example of which is shown symbolically in FIG. 8:

(a) Having received a packet at input 810 (step s71), the packet is inspected in an inspection module 820, which comprises a header inspection module 821 and a probabilistic codepoint identification module 822. The header inspection module 821 inspects the fragmentation fields (step s72) and checks (step s73) whether the packet is 'atomic' by testing whether bit 17 is "1" and the least significant bits (bits 18-31) are "0". If the packet is not atomic, the receiving equipment 8 can be certain that the packet does not come from sending equipment using the new ExA protocol (step s74), and if necessary or required, can then obtain information from the packet (step s75), interpreting the header field or fields in question according to the "old" protocol in an "old protocol" handler 831, performing other processing in respect of the packet in a processor 840 if appropriate, and passing the packet to an output 850, from which it may be forwarded, and continuing as appropriate (step s81). Otherwise (i.e. if the packet is atomic) the process continues via step s76, as set out in (b).

(b) If the packet has been found (at step s73) to be atomic, the forwarding or receiving equipment checks (step s76) whether the 'Reserved' flag (bit 16) is "0". If so, the process continues with step s77, discussed in (c). If not, the process proceeds directly to step s78, discussed in (d) below.

(c) If the 'Reserved' flag (bit 16) has been found (at step 76) to be "0", the forwarding or receiving equipment checks (step s77) whether bits 0-12 of the 'Identification' field are all zero. If they are not, the receiving equipment can be certain that the packet does not come from sending equipment using the ExA protocol, and may proceed to step s81 via steps s74 and s75 if appropriate, as set out above. Otherwise the process continues to step s78 as set out in (d), which involves what can be regarded as probabilistic codepoint identification, performed by functional module 822.

(d) The forwarding or receiving equipment then tests (step s78) whether bits 13-15 of the 'Identification' field are all zero. If they are all zero, the receiving equipment may assume that the packet does not come from sending equipment using the ExA protocol, and may proceed to step s81 via steps s74 and s75, as set out above. If bits 13-15 are not all zero, it assumes (i.e. on probabilistic grounds) that the packet has come from sending equipment using the ExA protocol, and passes these bits (at least) to the ExA protocol handler 832 (step s79), because it is highly probable (albeit not certain) that the packet has been sent or forwarded by sending equipment using the ExA protocol. Information is then obtained from the packet (step s80), interpreting bits 13-15 (at least) according to the new protocol. As before, other processing may be performed in respect of the packet in processor 840 if appropriate, and the packet may then be passed to output 850 from which it may be forwarded, the process then continuing as appropriate (step s81).

Figure 7:
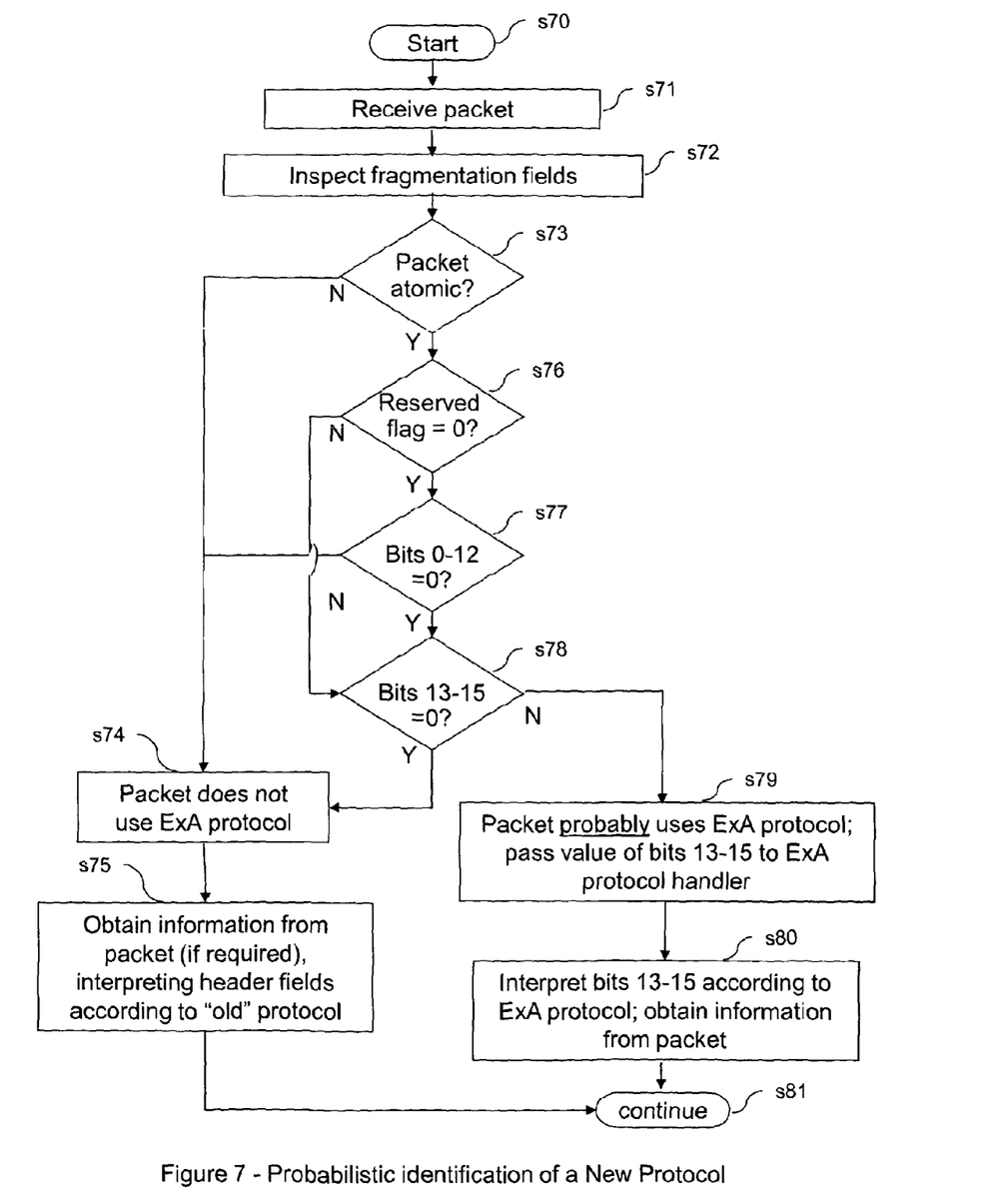
FIG. 7 is a flow-chart illustrating the probabilistic identification of use of a new protocol, and the obtaining of information from data items in accordance therewith, using a process according to a preferred embodiment of the invention.

The step of continuing (step s81) may involve forwarding or possibly "not forwarding" (e.g. dropping) the packet, in a manner which may depend on the information obtained from the packet. Alternatively or additionally, it may involve recording, storing or reporting information based on that obtained, in order to police the flow of which the packet forms a part, or to allow it to be policed, for example.

The process shown in FIG. 7 is broken down into the above steps for illustration purposes only. In practice it may well be simpler or otherwise more appropriate to optimise the above tests into fewer process steps. Similarly, with reference to FIG. 8, it will be understood that components of apparatus 8 such as the header inspection module 821, the probabilistic codepoint identification module 822, the protocol handlers 831 and 832, the processor 840 etc., need not be separate physical components of the apparatus 80, or may be grouped in different functional modules within apparatus 8. The functions attributed to some or all of these may in fact be performed by a single processor, for example, with the results of processing to achieve the functionality attributed to one functional element being used (where applicable) in a subsequent routine whereby to achieve the functionality attributed to another.

Returning to the description of the technique in general, it will be understood that it is possible for multiple sub-fields of the field or fields in question (such as the 'Identification' field, in the above example) to be assigned for use by multiple new protocols. In order to minimise the probability of wrongly judging that a packet is using a new protocol, only one new protocol should generally be used at a time if the 'Reserved' flag is cleared to zero. However, once at least one new protocol has received widespread acceptance, everyone will have an incentive to remove or repair non-compliant middleboxes until few remain. Then the 'Reserved' flag can be set to "1" and multiple new protocols will all be able to use sub-fields of the 'Identification' field, all at once.

The invention claimed is:

1. A method of obtaining and processing information from a predetermined portion of a header of a data item transmitted via a communication network, said portion carrying a codepoint which is one of a plurality of codepoints of a first set of codepoints, each codepoint of the first set of codepoints having a first pre-defined meaning according to a first pre-defined communication protocol, the method comprising:
   receiving the data item, the codepoint carried by the predetermined portion of the header of the data item being one of the plurality of codepoints of the first set of codepoints having the first pre-defined meaning according to the first pre-defined communication protocol;
   inspecting the header of the data item whereby to determine the codepoint carried by the predetermined portion thereof;
   identifying, using a computer processor, whether or not the codepoint is a member of a second set of codepoints, the second set of codepoints comprising fewer possible codepoints than the first set of codepoints, each codepoint of the second set of codepoints having a second pre-defined meaning according to a second pre-defined communication protocol;
   in the event that the codepoint carried by the predetermined portion of the header of the data item is not identified as being a member of the second set of codepoints, interpreting the codepoint of the data item according to the first pre-defined communication protocol as having the first pre-defined meaning of the codepoint and processing the data item based on the first pre-defined meaning of the codepoint;
   and otherwise, in the event that the codepoint carried by the predetermined portion of the header of the data item is identified as being a member of the second set of codepoints, and in dependence on such an identification being made, interpreting the codepoint of the data item according to the second pre-defined communication protocol as having the second pre-defined meaning of the codepoint and processing the data item based on the second pre-defined meaning of the codepoint, said second communication protocol differing from said first communication protocol, and said second pre-defined meaning of the codepoint differing from said first pre-defined meaning of the codepoint;
   wherein processing the data item based on the first pre-defined meaning comprises forwarding the data item via the communication network based on the first pre-defined meaning, and wherein processing the data item based on the second pre-defined meaning comprises forwarding the data item via the communication network based on the second pre-defined meaning.

2. A method according to claim 1, wherein the communication network is a digital network.

3. A method according to claim 1, wherein the predetermined portion of the header of the data item comprises one or more fields or parts of fields in the header of the data item.

4. A method according to claim 1, wherein the data item is an Internet Protocol packet.

5. A method according to claim 1, wherein the predetermined portion comprises a part or all of an 'Identification' field in the header of the data items.

6. A method according to claim 1, wherein the ratio between a total number of members in the first set of codepoints and a total number of members in the second set of codepoints is at least $2^n$: 1, where n is 4, 8, 12, 13 or 14.

7. A method according to claim 1, wherein the first pre-defined communication protocol relates to fragmentation of data items.

8. A method according to claim 7, wherein the first pre-defined meaning of a particular codepoint relates to identification of fragments of a data item carrying the codepoint.

9. A method according to claim 1, wherein the second pre-defined communication protocol relates to a path or network characteristic.

10. A method according to claim 1, wherein the second pre-defined communication protocol relates to path or network congestion.

11. A method according to claim 10, wherein the second pre-defined meaning of a particular codepoint carried by one or more data items relates to congestion experienced or expected to be experienced by one or more data items carrying said particular codepoint.

12. A method according to claim 2, wherein the digital network is a packet network.

13. Apparatus for obtaining and processing information from a predetermined portion of a header of a data item transmitted via a communication network, said portion carrying a codepoint which is one of a plurality of codepoints of a first set of codepoints, each codepoint of the first set of codepoints having a first pre-defined meaning according to a first pre-defined communication protocol, the apparatus comprising:
   a receiver for receiving the data item, the codepoint carried by the predetermined portion of the header of the data item being one of the plurality of codepoints of the first set of codepoints having the first pre-defined meaning according to the first pre-defined communication protocol;
   a processing system, including a computer processor, the processing system being at least configured to:
      inspect the header of the data item whereby to determine the codepoint carried by the predetermined portion thereof,
      identify whether or not the codepoint is a member of a second set of codepoints, the second set of codepoints comprising fewer possible codepoints than the first set of codepoints, each codepoint of the second set of codepoints having a second pre-defined meaning according to a second pre-defined communication protocol;

interpret the codepoint of the data item according to the first pre-defined communication protocol as having the first pre-defined meaning of the codepoint and process the data item based on the first pre-defined meaning of the codepoint in the event that the codepoint carried by the predetermined portion of the header of the data item is not identified as being a member of the second set of codepoints, and otherwise, in the event that the codepoint carried by the predetermined portion of the header of the data item is identified as being a member of the second set of codepoints, and in dependence on such an identification being made, to interpret the codepoint of the data item according to the second pre-defined communication protocol as having the second pre-defined meaning of the codepoint and to process the data item based on the second pre-defined meaning of the codepoint, said second communication protocol differing from said first communication protocol, and said second pre-defined meaning of the codepoint differing from said first pre-defined meaning of the codepoint;

wherein processing the data item based on the first pre-defined meaning comprises forwarding the data item via the communication network based on the first pre-defined meaning, and wherein processing the data item based on the second pre-defined meaning comprises forwarding the data item via the communication network based on the second pre-defined meaning.

14. The apparatus of claim 13, wherein the apparatus is a network element of the communication network for receiving and/or forwarding data items as packets.

15. The apparatus of claim 13, wherein the apparatus is a router of the communication network for receiving and/or forwarding the data item.

* * * * *